United States Patent [19]
Cox

[11] Patent Number: 5,806,447
[45] Date of Patent: Sep. 15, 1998

[54] PORTABLE SEWING MACHINE FOR USE IN A MOTOR VEHICLE

[76] Inventor: Carol Sue Cox, 435 Pennock Bridge Rd., West Grove, Pa. 19390

[21] Appl. No.: 899,259

[22] Filed: Jul. 23, 1997

[51] Int. Cl.[6] .............................. D05B 75/00; A47B 29/00
[52] U.S. Cl. ......................................... 112/217.1; 224/483
[58] Field of Search .............................. 112/217.1, 217.3, 112/258, 260, 169; 224/483; 108/44, 45, 47; 211/88.01

[56] References Cited

U.S. PATENT DOCUMENTS

| | | | |
|---|---|---|---|
| 2,898,170 | 8/1959 | Antonius | 224/483 X |
| 3,062,605 | 11/1962 | Cannon | 112/217.1 X |
| 3,662,982 | 5/1972 | Antonious | 224/483 X |
| 5,411,192 | 5/1995 | Xiao | 224/483 X |

Primary Examiner—Peter Nerbun

[57] ABSTRACT

A portable sewing machine for use in a motor vehicle including a sewing machine that has an electrical coupler for engaging a cigarette lighter of a vehicle. A table is provided and has a top side, a bottom side and a peripheral edge. The bottom side has a pair of legs mounted thereto. The table has a machine support for coupling the sewing machine thereto. Also, a mounting bracket has a generally rectangular backing attached. The mounting bracket is coupled to one side of the peripheral edge of the table. Lastly, a pair of dash straps are provided. Each strap is coupled to the mounting bracket. The pair of dash straps extend vertically from a dashboard for suspending the mounting bracket with the table from the dashboard of a vehicle. The mounting bracket, with the table coupled thereto, is suspended from the dash board for allowing the table to stand on the pair of legs in an upright orientation and support the sewing machine in the vehicle.

8 Claims, 3 Drawing Sheets

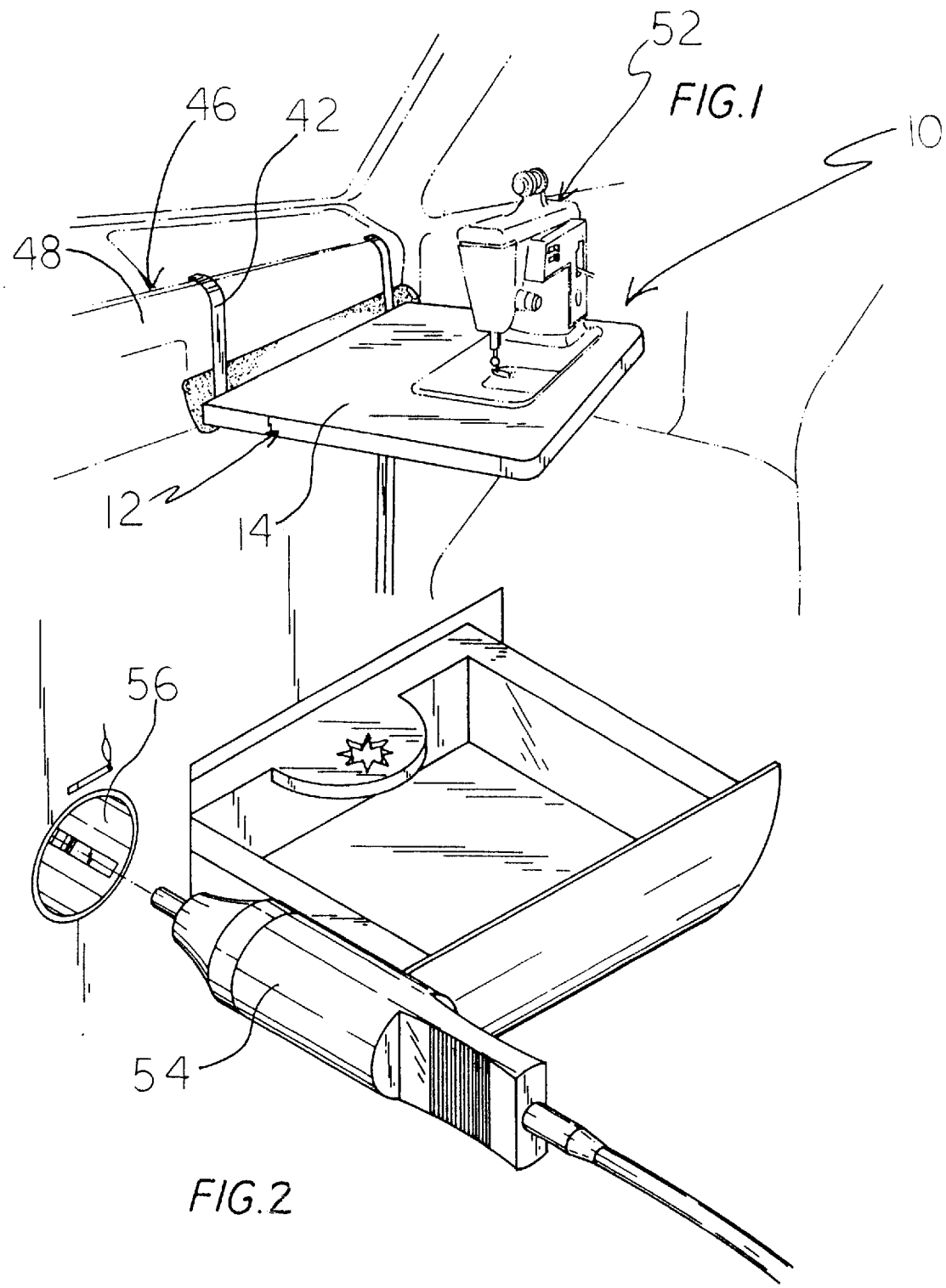

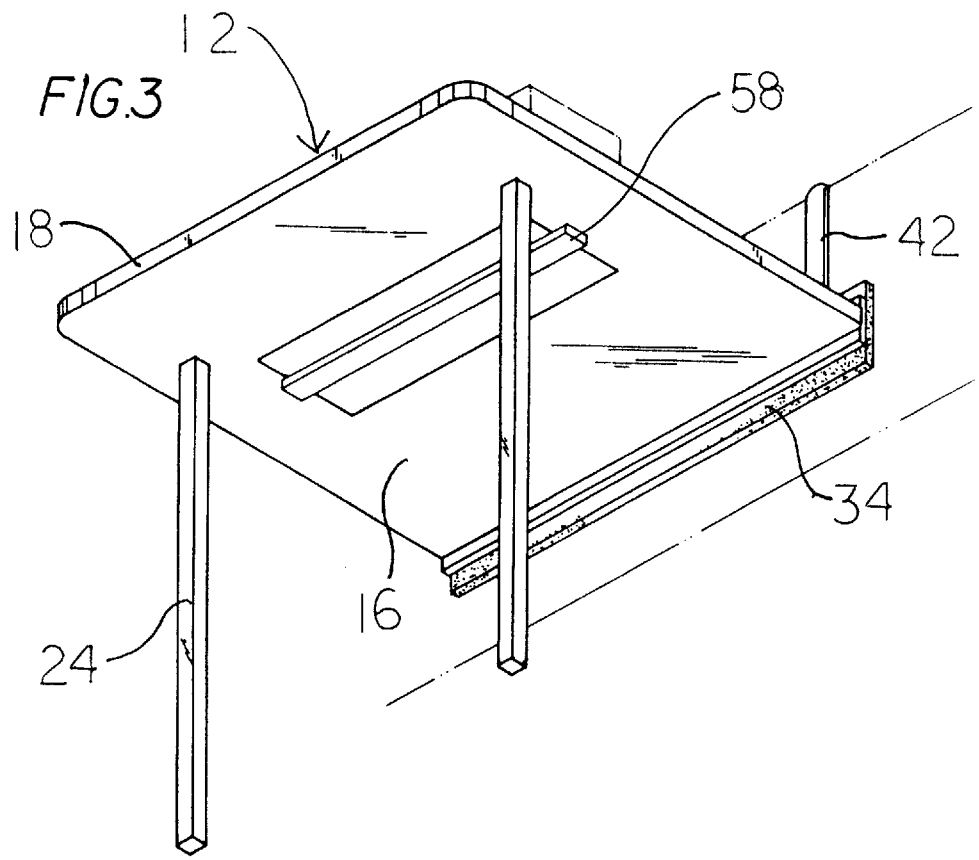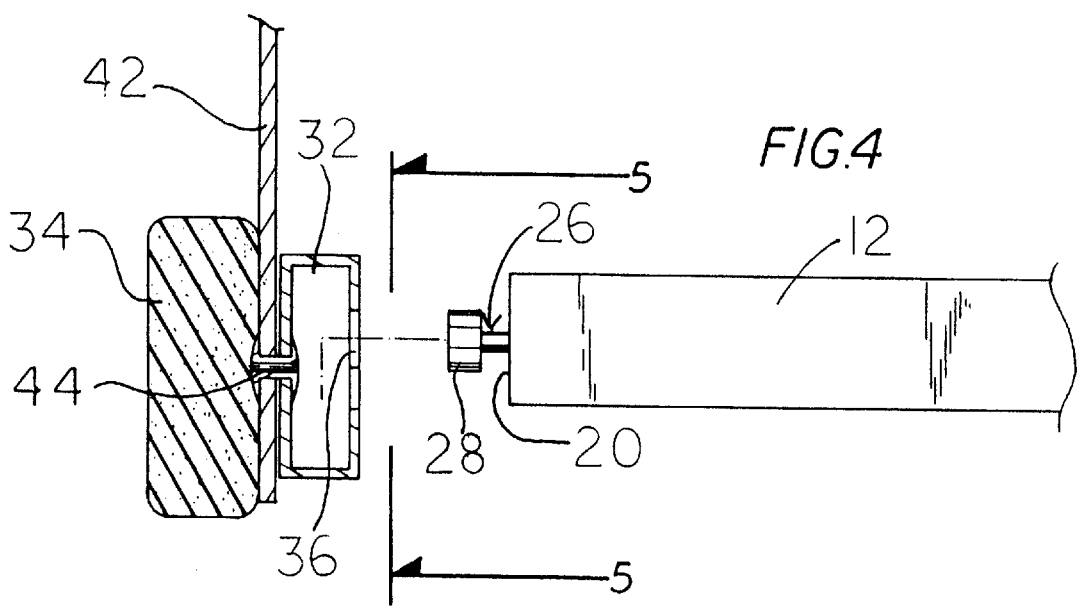

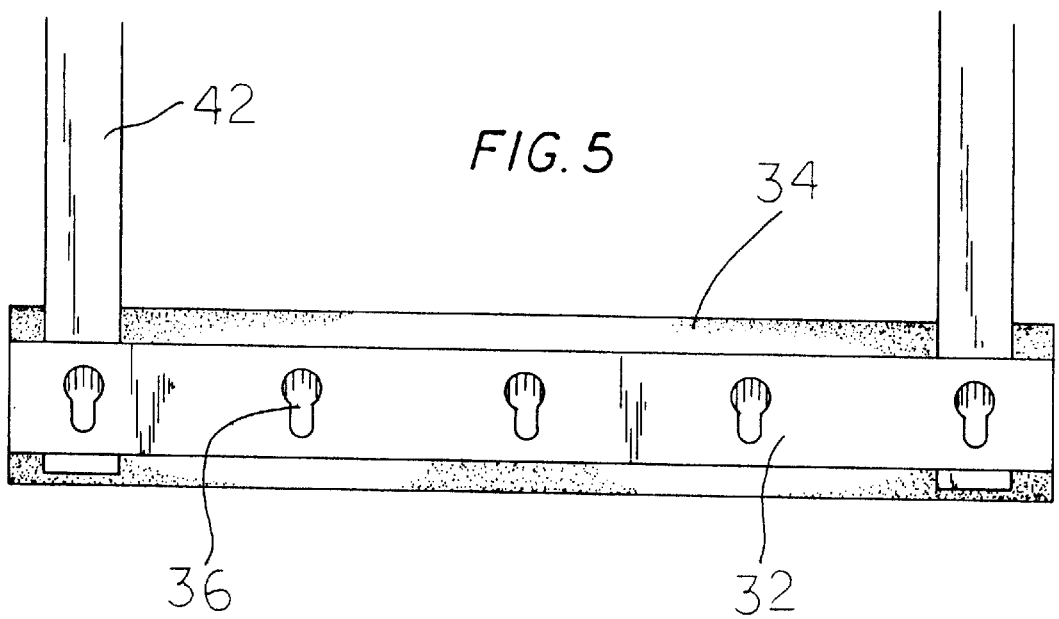

PORTABLE SEWING MACHINE FOR USE IN A MOTOR VEHICLE

BACKGROUND OF THE INVENTION

1. Field of the Invention

The present invention relates to a sew and go device and more particularly pertains to providing a table mountable within a vehicle and capable of supporting a sewing machine for use in the vehicle.

2. Description of the Prior Art

The use of a portable sewing machine is known in the prior art. More specifically, portable sewing machines heretofore devised and utilized for the purpose of sewing in various locations are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,940,003 to Mayhew et al. discloses a car seat table. U.S. Pat. No. 4,524,701 to Chappell discloses detachable car seat tables. U.S. Pat. No. 4,512,503 to Gioso discloses an all purpose vehicle travel organizer. U.S. Pat. No. 4,079,684 to Thomson discloses sewing machine. U.S. Pat. No. 4,068,908 to Horn discloses a writing-table and machine-table combination. Lastly, U.S. Pat. Des. 296,725 to Iacovelli discloses a combined cigarette and lighter holder, beverage holder and tray for an automobile dash.

In this respect, the Sew and go device according to the present invention substantially departs from the conventional concepts and designs of the prior art, and in so doing provides an apparatus primarily developed for the purpose of providing a table mountable within a vehicle and capable of supporting a sewing machine for use in the vehicle.

Therefore, it can be appreciated that there exists a continuing need for a new and improved Sew and go device which can be used for providing a table mountable within a vehicle and capable of supporting a sewing machine for use in the vehicle. In this regard, the present invention substantially fulfills this need.

SUMMARY OF THE INVENTION

In view of the foregoing disadvantages inherent in the known types of portable sewing machines now present in the prior art, the present invention provides an improved Sew and go device. As such, the general purpose of the present invention, which will be described subsequently in greater detail, is to provide a new and improved sew and go device which has all the advantages of the prior art and none of the disadvantages.

To attain this, the present invention essentially comprises a generally rectangular table. The table has a top side, a bottom side and a peripheral edge. The peripheral edge has a front end edge and a rear end edge. The bottom side has a pair of legs mounted thereto. Each leg is proportionately spaced one from another. Each leg is spaced from the front end edge of the peripheral edge. The rear end edge of the table has a plurality of mounting pins projecting outwardly. Also, a generally rectangular mounting bracket is provided. The mounting bracket has a generally rectangular backing attached. The mounting bracket has a plurality of pin slots therein proportionately spaced about a length of the mounting bracket. The pin slots are sized for receiving the mounting pins of the table for coupling of the table to the mounting bracket. A pair of dash straps are included and each strap is coupled to the mounting bracket. Each of the dash straps are spaced apart when coupled to the mounting bracket. The pair of dash straps extend vertically from a dashboard for suspending the mounting bracket from the dashboard of a vehicle. The mounting bracket, when suspended from the dashboard, allows the backing to rest against a front panel of the dash board. The mounting bracket, with the table coupled thereto, is suspended from the dash board and allows the table to stand on the pair of legs in an upright orientation in the vehicle. Lastly, a portable sewing machine is included. The sewing machine has an electrical coupler for engaging a cigarette lighter of the vehicle. The sewing machine is mounted onto the table and coupled to the table with a machine support. The machine support is mounted to the bottom side of the table. The sewing machine is powered by plugging the coupler into the cigarette lighter. The sewing machine, when mounted onto the table, is supported by the mounting bracket and the pair of legs and operable within the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sew and go device which has all the advantages of the prior art portable sewing machines and none of the disadvantages.

It is another object of the present invention to provide a new and improved sew and go device which may be easily and efficiently manufactured and marketed.

It is a further object of the present invention to provide a new and improved sew and go device which is of a durable and reliable construction.

An even further object of the present invention is to provide a new and improved sew and go device which is susceptible of a low cost of manufacture with regard to both materials and labor, and which accordingly is then susceptible of low prices of sale to the consuming public, thereby making such Sew and go device economically available to the buying public.

Still yet another object of the present invention is to provide a new and improved sew and go device which provides in the apparatuses and methods of the prior art some of the advantages thereof, while simultaneously overcoming some of the disadvantages normally associated therewith.

Still another object of the present invention is to providing a table mountable within a vehicle and capable of supporting a sewing machine for use in the vehicle.

Lastly, it is an object of the present invention to provide a new and improved sew and go device including a sewing machine that has an electrical coupler for engaging a cigarette lighter of a vehicle. A table is provided and has a top side, a bottom side and a peripheral edge. The bottom side has a pair of legs mounted thereto. The table has a machine support for coupling the sewing machine thereto. Also, a mounting bracket has a generally rectangular backing attached. The mounting bracket is coupled to one side of the peripheral edge of the table. Lastly, a pair of dash straps are provided. Each strap is coupled to the mounting bracket. The pair of dash straps extend vertically from dashboard for spending the mounting bracket with the table from the dashboard of a vehicle. The mounting bracket, with the table coupled thereto, is suspended from the dash board for allowing the table to stand on the pair of legs in an upright orientation and support the sewing machine in the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the sew and go device constructed in accordance with the principles of the present invention.

FIG. 2 is an enlarged view of the coupler of the sewing machine.

FIG. 3 is bottom isometric view of the table of the present invention.

FIG. 4 is a cut-away view depicting the coupling of the table and mounting bracket.

FIG. 5 is a frontal view of the mounting bracket taken along line 5—5 of FIG. 4.

Similar reference characters refer to similar parts throughout the several views of the drawings.

DESCRIPTION OF THE PREFERRED EMBODIMENT

With reference now to the drawings, and in particular to FIG. 1 thereof, a new and improved Sew and go device embodying the principles and concepts of the present invention and generally designated by the reference numeral 10 will be described.

The present invention, the new and improved sew and go device, is comprised of a plurality of components. Such components in their broadest context include a table, a mounting bracket, a dash strap and a sewing machine. Such components are individually configured and correlated with respect to each other so as to attain the desired objective.

More specifically, the present invention includes a generally rectangular table 12. The table, as shown in FIG. 1, is made of plastic or wood. The table has a top side 14, a bottom side 16 and a peripheral edge. The peripheral edge has a front end edge 18 and a rear end edge 20. As illustrated in FIG. 3, the bottom side has a pair of legs 24 attached. Each leg is proportionately spaced one from another. Each leg is spaced from the front end edge of the peripheral edge.

Also, the rear end edge of the table has a plurality of mounting pins 26. The mounting pins project outwardly from the table. The mounting pin may be made of wood, plastic or metal. Each mounting pin has a pin head 28.

Additionally, a generally rectangular mounting bracket 32 is provided. Attached to the mounting bracket is a generally rectangular backing 34. Preferably the backing is a foam material or other soft material. As seen in FIG. 5, the mounting bracket has a plurality of pin slots 36. The pin slots are proportionately spaced about a length of the mounting bracket. The pin slots are sized for receiving the heads 28 of the mounting pins of the table 12. The mounting pins slide into the pin slots and couple the table to the mounting bracket.

A pair of dash straps 42 are included. Each strap is coupled to the mounting bracket with a rivet 44, as shown in FIG. 4. Each of the dash straps are spaced apart when coupled to the mounting bracket. As seen in FIG. 1, the pair of dash straps extend vertically from a dashboard 46 for suspending the mounting bracket from the dashboard of a vehicle. The mounting bracket, when suspended from the dashboard, allows the backing to rest against a front panel 48 of the dash board. The mounting bracket, with the table coupled thereto, is suspended from the dash board and allows the table to stand on the pair of legs 24 in an upright orientation in the vehicle.

Lastly, a portable sewing machine 52 is included. The sewing machine has an electrical coupler 54 for engaging a cigarette lighter 56 of the vehicle. The sewing machine is mounted onto the table and coupled to the table with a machine support 58, as shown in FIG. 3. The machine support is mounted to the bottom side 16 of the table. The sewing machine is powered by plugging the coupler into the cigarette lighter. The sewing machine, when mounted onto the table, is supported by the mounting bracket and the pair of legs and operable within the vehicle.

The present invention sew and go attaches to the dashboard of any vehicle. The sewing machine of the present invention plugs into the cigarette lighter. This will allow one to use the sewing machine any where and at any time. The height of the table from the floor board of the vehicle is about 21½ inches. The length of the table is 24 inches and the width of the table is 18½ inches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A new and improved portable sew and go device comprising in combination:

a generally rectangular table having a top side, a bottom side and a peripheral edge therearound, the peripheral edge having a front end edge and a rear end edge, the bottom side having a pair of legs attached thereto, each leg being proportionately spaced one from another, each leg being spaced from the front end edge of the peripheral edge, the rear end edge of the table having a plurality of mounting pins projecting outwardly therefrom;

a generally rectangular mounting bracket having a generally rectangular backing attached thereto, the mounting bracket having a plurality of pin slots therein proportionately spaced about a length of the mounting bracket, the pin slots being sized for receiving the mounting pins of the table for coupling of the table to the mounting bracket;

a pair of dash straps with each strap being coupled to the mounting bracket, each of the dash straps being spaced apart when coupled to the mounting bracket, the pair of dash straps extending vertically from a dashboard for suspending the mounting bracket from the dashboard of a vehicle, the mounting bracket when suspended from the dashboard allows the backing to rest against a front panel of the dash board, the mounting bracket with the table coupled thereto being suspended from the dash board for allowing the table to stand on the pair of legs in an upright orientation in the vehicle; and a portable sewing machine having an electrical coupler for engaging a cigarette lighter of a vehicle, the sewing machine being mounted onto the table and coupled thereto with a machine support mounted to the bottom side of the table, the sewing machine being powered by plugging the coupler into the cigarette lighter, the sewing machine when mounted onto the table supported by the mounting bracket and pair of legs being operable within the vehicle.

2. A portable sew and go device comprising:

a sewing machine having an electrical coupler for engaging a cigarette lighter of a vehicle;

a table having a top side, a bottom side and a peripheral edge therearound, the bottom side having a pair of legs attached thereto, the table having a machine support for coupling the sewing machine thereto;

a mounting bracket having a generally rectangular backing attached thereto, the mounting bracket being coupled to one side of the peripheral edge of the table; and a pair of dash straps with each strap being coupled to the mounting bracket, the pair of dash straps extending vertically from a dashboard for suspending the mounting bracket with the table from the dashboard of a vehicle, the mounting bracket with the table coupled thereto being suspended from the dash board for allowing the table to stand on the pair of legs in an upright orientation and supporting the sewing machine in the vehicle.

3. The portable sew and go device as set forth in claim 2 wherein the peripheral edge of the table has a front end edge and a rear end edge, each leg of the table being proportionately spaced one from another, and each leg being spaced from the front end edge of the peripheral edge.

4. The portable sew and go device as set forth in claim 3, wherein the rear end edge of the table has a plurality of mounting pins projecting outwardly therefrom.

5. The portable sew and go device as set forth in claim 4 wherein the mounting bracket has a plurality of pin slots therein proportionately spaced about a length of the mounting bracket, and the pin slots being sized for receiving the mounting pins of the table for coupling of the table to the mounting bracket.

6. The portable sew and go device as set forth in claim 2 wherein each of the dash straps is spaced apart when coupled to the mounting bracket.

7. The portable sew and go device as set forth in claim 2 wherein the mounting bracket, when suspended from the dashboard, allows the backing to rest against a front panel of the dash board.

8. The portable sew and go device as set forth in claim 2 wherein the sewing machine is powered by plugging the coupler into the cigarette lighter, and the sewing machine when mounted onto the table supported by the mounting bracket and pair of legs is operable within the vehicle.

\* \* \* \* \*